United States Patent [19]
Dilger

[11] Patent Number: 6,029,120
[45] Date of Patent: Feb. 22, 2000

[54] BOW-MOUNTED CHRONOGRAPH

[75] Inventor: John Patrick Dilger, Marshalltown, Iowa

[73] Assignee: Innoventive Technologies and Services LLC, Marshalltown, Iowa

[21] Appl. No.: 09/009,030

[22] Filed: Jan. 20, 1998

[51] Int. Cl.[7] .................................................. F41B 5/14
[52] U.S. Cl. .................... 702/142; 702/150; 324/178; 324/179; 346/38; 124/86
[58] Field of Search .................................. 702/142, 150; 324/178, 179; 346/38; 124/35.2, 86–91; 42/1.14, 1.01; 368/114, 107, 113, 121

[56] References Cited

U.S. PATENT DOCUMENTS

| | | | |
|---|---|---|---|
| 3,401,334 | 9/1968 | Bell | 324/178 |
| 3,787,770 | 1/1974 | Cote et al. | 324/178 |
| 4,061,107 | 12/1977 | Smith | 116/67 R |
| 4,457,206 | 7/1984 | Toulios et al. | 89/14.05 |
| 4,542,732 | 9/1985 | Troncoso | 124/90 |
| 4,837,718 | 6/1989 | Alon | 73/167 |
| 5,349,853 | 9/1994 | Oehler | 73/167 |
| 5,435,292 | 7/1995 | Armstrong | 124/86 |
| 5,553,597 | 9/1996 | Sparks | 124/86 |

OTHER PUBLICATIONS

1998 Competition Electronics, unattributed ProChrono Plus Insutrctions, no date.

*Primary Examiner*—Marc S. Hoff
*Assistant Examiner*—Craig Steven Miller

[57] ABSTRACT

A instrument and method for measuring archery tackle performance is disclosed. A low power, electronics measurement unit attached onto or mounted internal to a bow in communication with a sensor which detects a signal from an external trigger mechanism mounted onto or internal to an arrow shaft for the purposes of measuring arrow velocity or collecting data indicative of arrow position. The statistical parameters of the collected data may then be used to determine and improve archery tackle performance in any shooting situation.

15 Claims, 14 Drawing Sheets

BOW-MOUNTED CHRONOGRAPH

BACKGROUND

1. Field of Invention

This invention relates to archery equipment, specifically to an improved method of measuring arrow velocity or arrow position.

2. Description of Prior Art

Previously, arrow velocity was determined by placing a complex mechanical apparatus adjacent to a stationary target. One such invention is described in U.S. Pat. No. 3,401,334. To measure arrow velocity, a moveable target released from the apparatus would fall in the arrow path down the surface of the stationary target. As the arrow strikes die stationary target, the moving target is pinned to the stationary target. By knowing the moveable target's relationship with respect to gravity, the measured distance it fell, and the distance the arrow traveled, arrow velocity could be calculated. This method can be very inaccurate since the falling target must be released at the precise moment the arrow is loosed from the bow.

As the state of the ar in electronics advanced, independent or stand-alone chronographs were developed to measure transit time of a moving projectile. This alternate method utilizes an independent electronic chronograph to measure arrow velocity. As I understand it, photoelectric devices use ambient light or incandescent light to detect the arrow "shadow" as it passes through the two-stage chronograph window. An electronic circuit calculates arrow velocity based upon the "shadow" transit time and the known length of the chronograph window. As with the first technique, arrow velocity can only be conveniently measured while the arrow is released towards a stationary target with die measuring device placed in a predetermined position.

This present invention provides the archer with the capability of measuring arrow velocity or providing data indicative of arrow position any time the arrow is released at any stationary or moving target. With intimate mounting to tie bow, the present invention delivers enhanced sensitivity to arrow travel not available with prior state-of-the-art designs. This measurement technique is now feasible due to advances in low power electronics.

OBJECTS AND ADVANTAGES

Accordingly, one feature of the present invention is an electronic chronograph measurement unit that can be mounted external to the bow riser. Various attachment mechanisms can be employed. A bracket assembly can be attached to the bow riser to provide convenient installation and removal. A double-sided adhesive tape can provide attachment between the chronograph measurement unit and the bow riser. Yet another method would utilize the arrow rest plunger through-hole and bow sight mounting holes to attach the chronograph measurement unit to the bow riser. One advantage of this feature is the ability to provide arrow velocity or arrow position measurement in any shooting situation on many different bow configurations.

Another feature of this invention relates to mounting the chronograph measurement unit internal to the bow riser. A machined or cast cavity to accommodate the electronic chronograph assembly can be placed in the bow riser during its manufacture. An advantage of this feature is the capability to permanently integrate a compact, reliable chronograph into a bow assembly.

Another feature of this invention relates to the mounting of an inexpensive trigger mechanism conveniently to the arrow shaft. One method is to attach multiple permanent magnet(s) external to a nonmagnetic arrow shaft. The magnets can be attached with a quick-set epoxy. Additionally, the magnets could be placed internal to the arrow shaft. An advantage of this feature is that the inexpensive trigger mechanism adds negligible mass to the arrow shaft.

Another feature of this invention relates to the ability to mount the electronic chronograph measurement unit on a right-handed or left-handed bow.

Another feature of this invention relates to the determination of arrow velocity or arrow position using a single sensor. A single magnetic sensor can provide a pulse width or a frequency signal that is directly proportional to the arrow velocity or arrow position. This feature has the advantage over a multiple sensor approach in that the system can be less complex, more compact, and less costly.

In accordance with another feature of the present invention, consecutive arrow velocity or arrow position data can be stored in memory and conveniently recalled. A push-button assembly provides a mechanism to retrieve and display consecutive arrow velocity or arrow position measurements, average arrow velocity or arrow position, maximum arrow velocity or arrow position, and minimum arrow velocity or arrow position.

These and other features and advantages will be apparent in view of the detailed description and operation of the preferred and alternate embodiments which are referenced in the drawings provided.

SUMMARY

In accordance with the present invention a low power, electronics measurement unit is attached onto or mounted internal to a bow riser. An external trigger mechanism is mounted onto or internal to an arrow shaft of nonmagnetic material for the purposes of measuring arrow velocity or arrow position.

DETAILED DESCRIPTION AND OPERATION OF THE PREFERRED EMBODIMENTS

Figure 3:
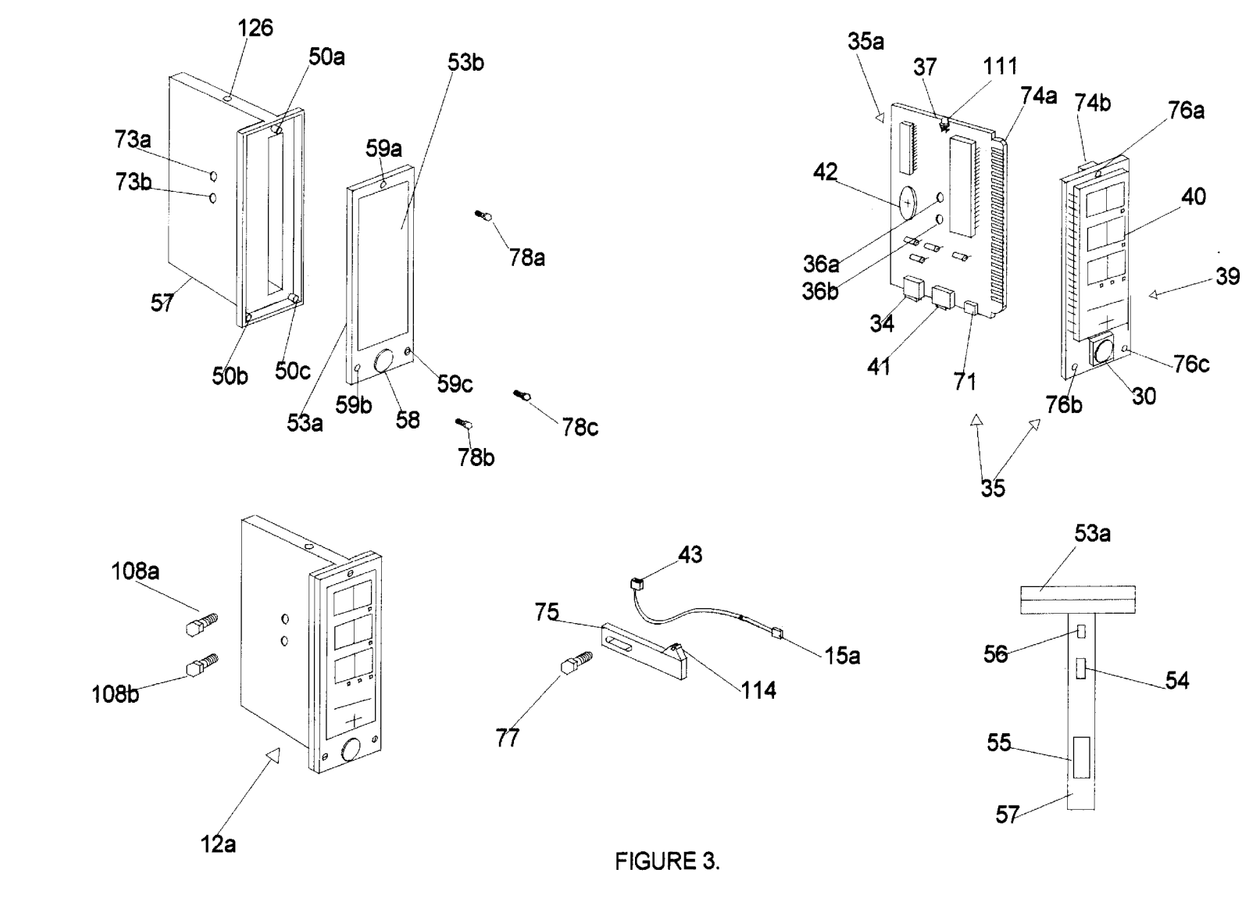
FIG. 3. A perspective view of the chronograph measurement unit with a magnetic sensor cable-connector assembly.

A perspective view of a bow-mounted chronograph measurement unit is illustrated in FIG. 3. The bow-mounted chronograph measurement unit is a battery-powered electronic circuit that is designed to be mounted external to a bow riser. The chronograph measurement unit can display statistical parameters of collected data through a user-selectable interface.

Figure 1A:
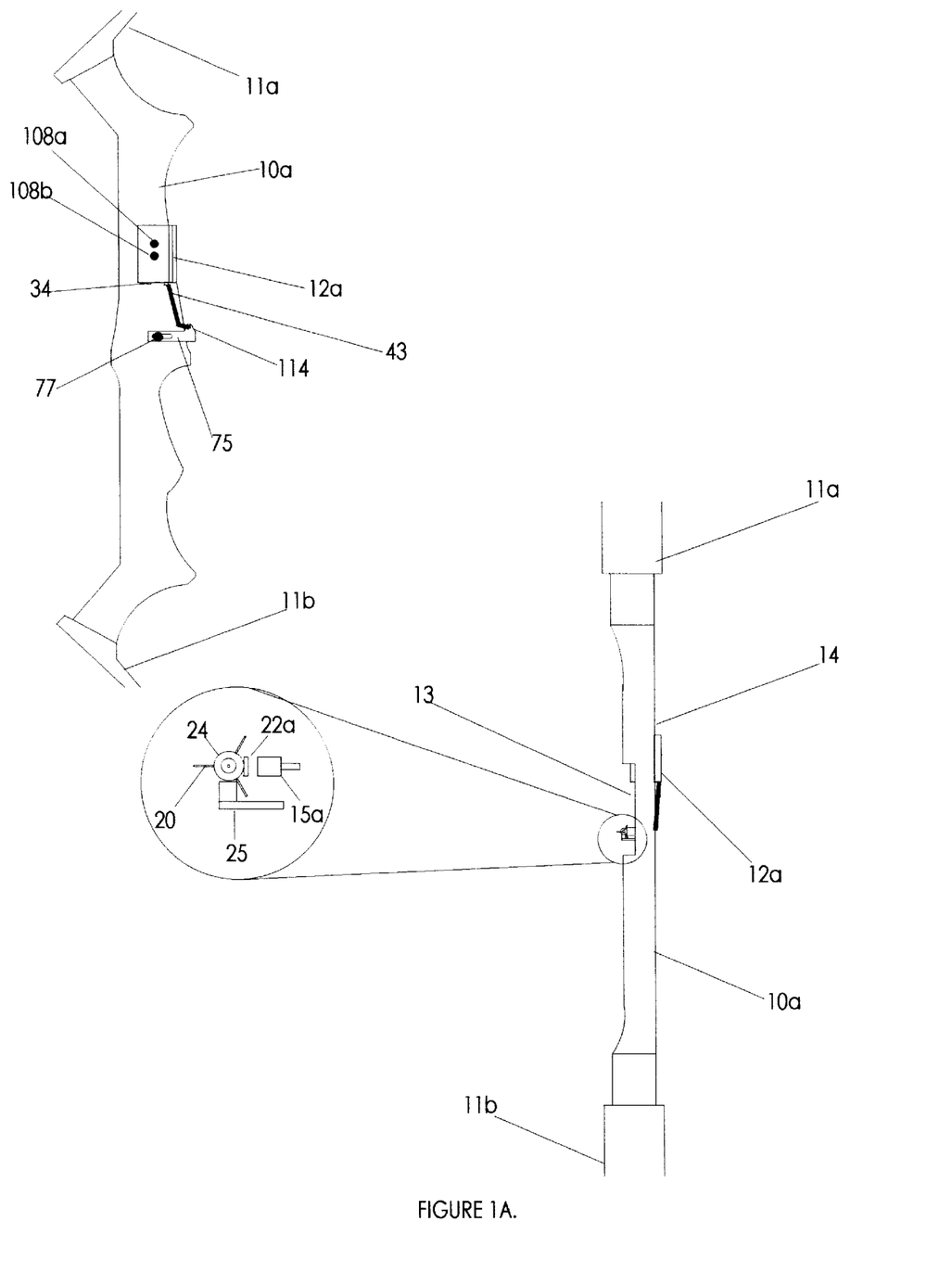
FIG. 1A. Side view and Front view of an external bow-mounted chronograph installed on a left-handed bow.

All structural features are illustrated in FIG. 3. The bow-mounted chronograph measurement unit 12a is comprised of an injection molded plastic housing assembly 57, a bezel 53a, a display lens 53b and a chronograph electronics assembly 35. The chronograph measurement unit or assembly also includes a magnetic sensor 15a that is responsive to the presence of a magnet field. Magnetic sensor 15a is a commercially available, latching magnetic sensor with a Schmitt Trigger output. A sensor cable-connector assembly 43 connects a voltage source 42 to magnetic sensor 15a. Magnetic sensor 15a output is connected to a chronograph measurement unit 12a through cable-connector assembly 43 via connector 71 through access hole 56. Chronograph electronics assembly 35 contains computational assembly 35a and display assembly 39. Computational assembly 35a attaches to display assembly 39 through edge connectors 74a and 74b. Chronograph electronics assembly 35 mounts in plastic housing assembly 57 and is retained by bezel 53a. Bezel 53a connects to plastic housing assembly 57 by three screws 78a, 78b, and 78c. Screws 78a, 78b, and 78c connect to mounting bosses 50a, 50b, and 50c through mounting holes 59a, 59b, and 59c in bezel 53a and through mounting holes 76a, 76b, and 76c in display assembly 39. Magnetic sensor 15a attaches to bow riser 10a with bracket 75 by the arrow rest plunger bolt 77 as illustrated in FIG. 1A.

Chronograph measurement unit 12a mounts to bow riser 10a with mounting bolts 108a and 108b using conventional bow sight mounting holes via mounting holes 73a and 73b in plastic housing assembly 57 and mounting holes 36a and 36b in computational assembly 35a. Chronograph measurement unit 12a has ambidextrous mounting capability. FIG. 1A identifies an inboard side 13 and an outboard side 14 to bow riser 10a. As previously mentioned, bow riser 10a is a left-handed version. To mount chronograph measurement unit 12a externally on a right-handed bow riser, characteristically identify the inboard 13 and outboard 14 side from FIG. 1A on a right-handed bow riser and mount as previously described. The electronic schematic for computational assembly 35a is illustrated is FIG. 5A. Computational assembly 35a contains a microcontroller or microprocessor 84. Microcontroller 84 contains internal timer-capture hardware, interrupt circuitry, bi-directional input and output lines, and memory required to interface to the hardware disclosed in the present invention. Microcontroller 84 connects to a display driver 85 through interface lines 89 placed upon a printed wing board 37. A display driver 85 contains the necessary timing and interface circuitry to control a display 40. Display driver 85 connects to a display 40, such as an LCD, on display assembly 39 through interface lines 90. From sensor cable-connector assembly 43 in FIG. 3, magnetic sensor 15a interfaces to timer-capture interrupt circuit internal to microcontroller 84 through interface 88a. Magnetic sensor 15a has an open collector output pulled-up through a resistor to the power rail. Microcontroller 84 and display driver 85 connect to a power switch 34 through lines 81a. Magnetic sensor 15a connects to power switch 34 through line 107. Power switch 34 connects to a battery-power supply 42 through connection 81b.

As illustrated in FIG. 3, power switch 34 access is made available through access hole 55 in plastic housing assembly 57. An oscillator 82 provides an electronic time base for microcontroller 84 through line 83. A mode-select momentary push-button switch 41 connects to an interrupt pin on microcontroller 84 through line 93. Access to mode-select switch 41 occurs through access hole 54 in plastic housing assembly 57. A reset momentary push-button switch 30 connects to the microcontroller 84 through line 94. Access to reset switch 30 occurs through access hole 58 in bezel 53a. For installation of the magnetic triggers, an electronic compass 109 is provided in this invention.

Figure 1B:
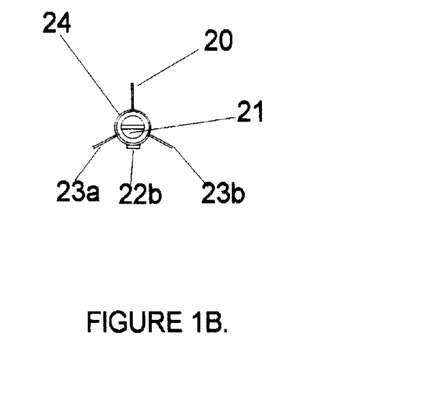
FIG. 1B. End view of a three feather(vane) arrow with a disk shaped magnetic trigger installed.
Figure 1C:
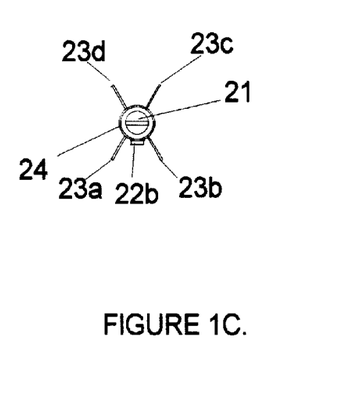
FIG. 1C. End view of a four feather(vane) arrow with a disk shaped magnetic trigger installed.
Figure 2A:
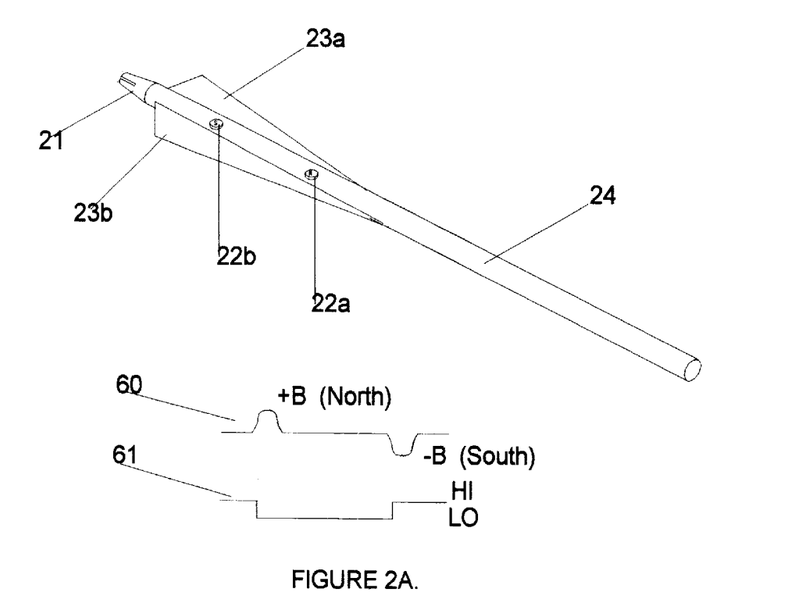
FIG. 2A. A perspective view of an arrow shaft with a dual, opposite-pole disk magnetic trigger installed and its associated magnetic flux and magnetic sensor electrical characteristics.
Figure 5A:
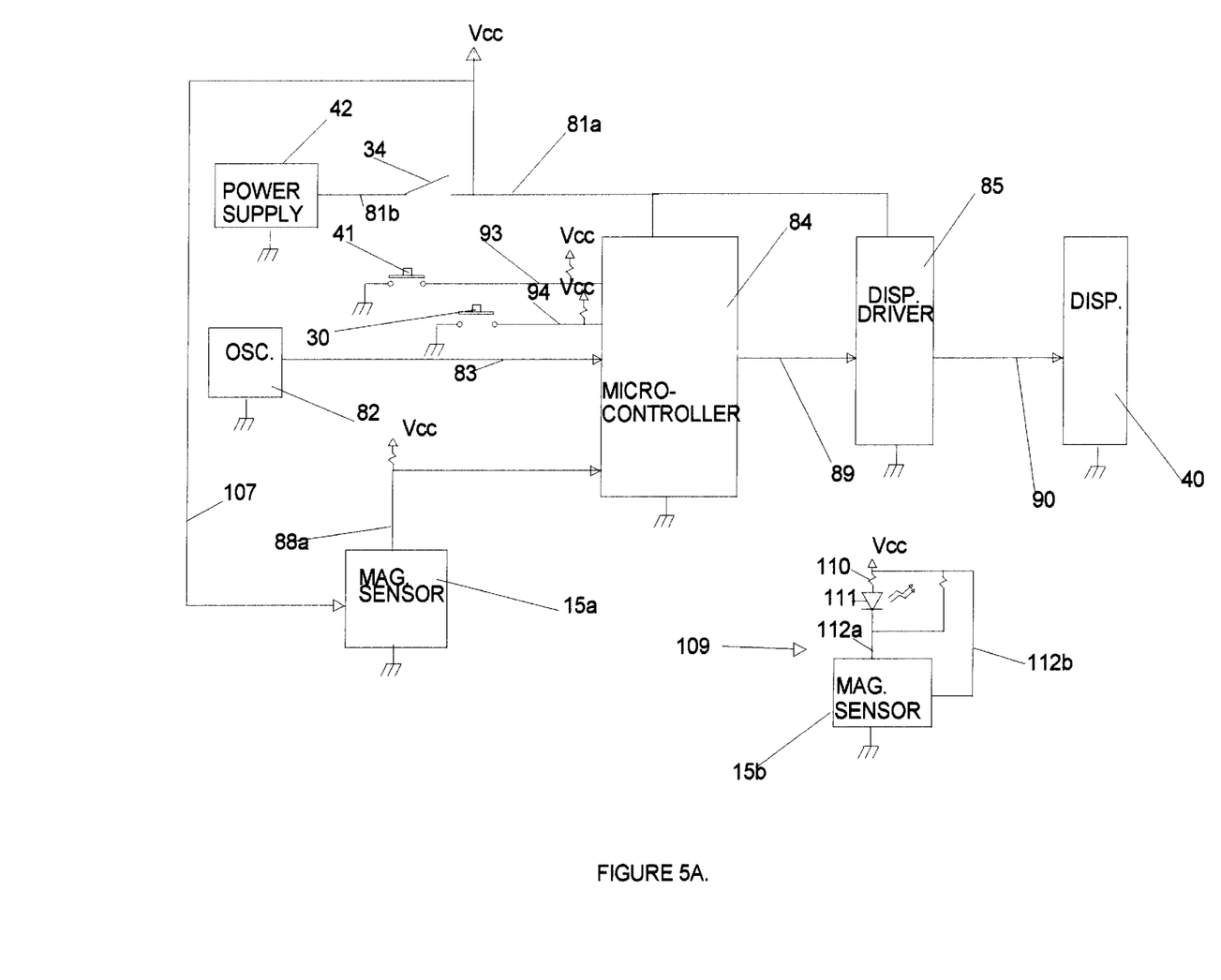
FIG. 5A. A schematic of an electronic circuit to measure pulse width using internal hardware.

The electronic compass 109 includes an additional magnetic sensor 15b, a current limiting resistor 110, and an LED 111. Magnetic sensor 15b is a nonlatching magnetic sensor with a Schmitt Trigger output. LED 111 is connected to magnetic sensor 15b by line 112a and is viewed through access hole 126 in plastic housing assembly 57. Magnetic sensor 15b is connected to power switch 34 by line 112b and its open-collector output has a pull-up resistor to power switch 34. Magnetic sensor 15b is mounted on computational unit 35a with the activation side towards the top of plastic housing assembly 57 adjacent to access hole 126. All electronic components are connected to a common reference as indicated in FIG. 5A. The magnetic trigger assembly is illustrated in FIG. 2A. The permanent magnets 22a and 22b comprise a dual, opposite-pole magnetic trigger assembly. A suitable material is a rare earth permanent magnet disk. Permanent magnet 22a is oriented such that the north pole is placed outward from the surface of tie nonmagnetic arrow shaft 24 and permanent magnet 22b is placed with the south pole outward from arrow shaft 24. The required magnetic orientation of permanent magnets 22a and 22b is achieved using the electronic compass 109 provided in chronograph measurement unit 12a. A north pole on permanent magnet 22a and 22b will cause LED 111 to be illuminated when placed approximately 0.100 inches from electronic compass 109 located in top of plastic housing 57 adjacent to access hole 126. Permanent magnets 22a and 22b are placed colinearly with three inches of separation distance. The location of the permanent magnets 22a and 22b for a three feather (vane) arrow is shown in FIG. 1B. The end view only shows permanent magnet 22b since the magnet triggers are placed colinearly. For a three feather arrow, permanent magnet 22b is placed opposite of the "cock" feather 20. Conventionally, the "cock" feather 20 can be identified as the odd colored feather. The remaining "hen" feathers 23a and 23b are located on both sides of permanent magnet 22b. The permanent magnets 22a and 22b can be attached to arrow shaft 24 with any suitable adhesive such as quick-set epoxy. The location of permanent magnet 22b on a four feather arrow is illustrated is FIG. 1C.

Figure 1D:
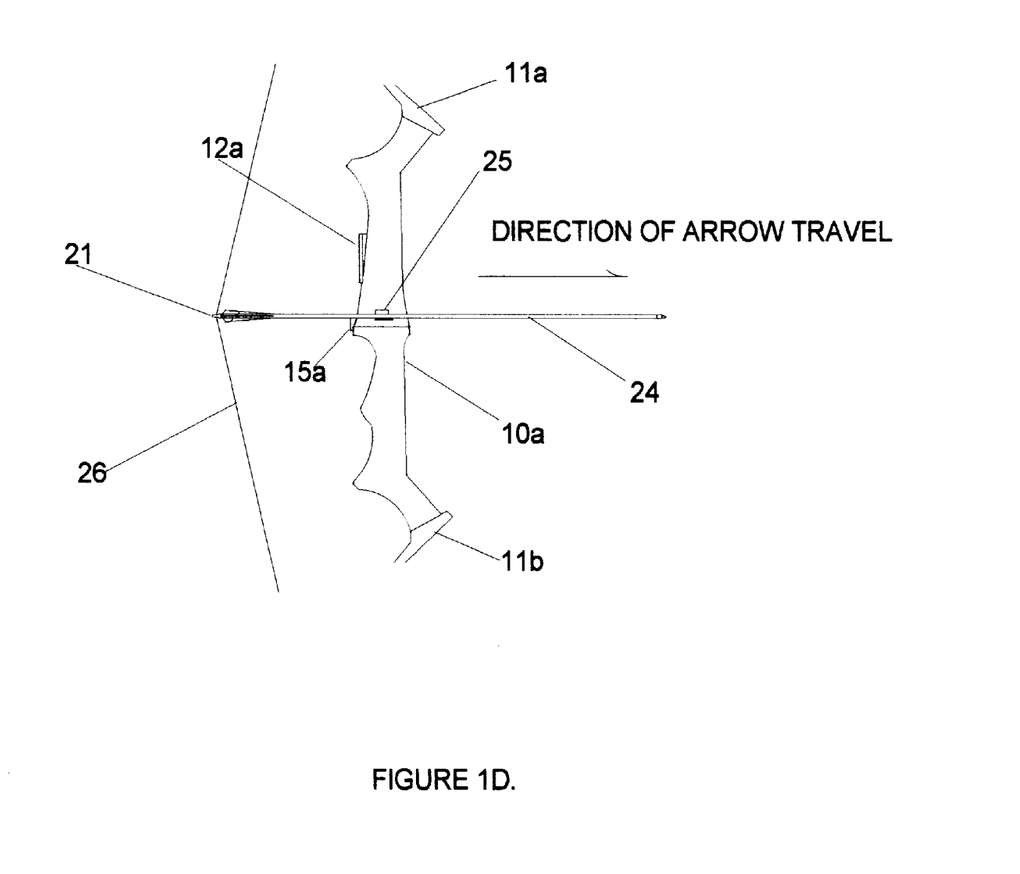
FIG. 1D. Side view of a left-handed bow and arrow in operation with an external bow-mounted chronograph installed.
Figure 4A:
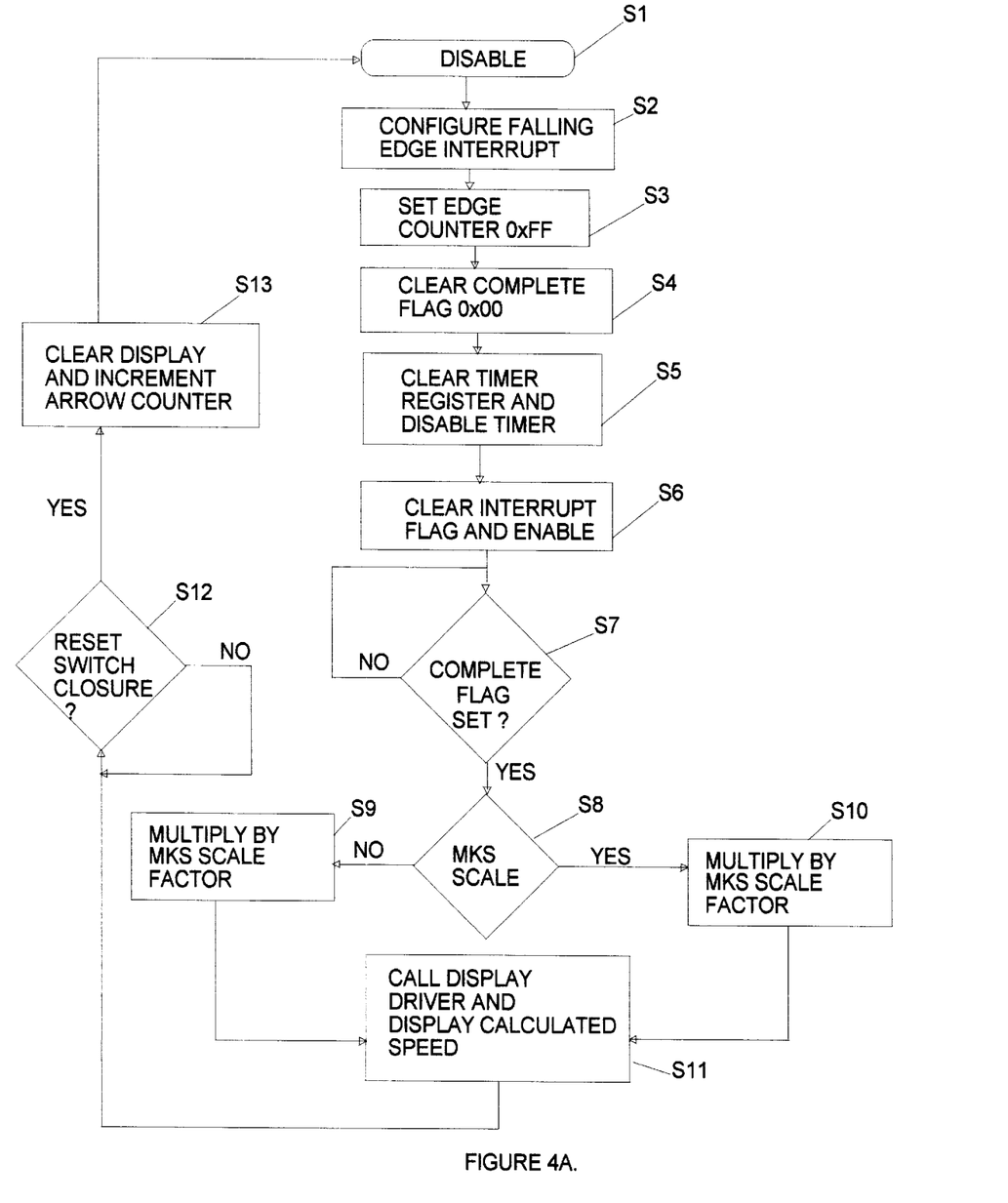
FIG. 4A. A software flowchart for pulse width measurement using an internal timer circuit.

The preferred embodiment uses a very simple method to determine arrow velocity or present data indicative of arrow position. Arrow velocity is typically measured as "distance per unit of time" (e.g., feet per second). This invention discloses a method to create a trigger mechanism, of known transit length, integral to an arrow and measure the transit time via electronic time base. The following equation illustrates the principle as I understand it:

Let, $\gamma$:=Arrow velocity d:=Trigger Mechanism Length, feet t:=Transit Time, seconds so, $\gamma$:=d÷t, feet per second The operation of the preferred embodiment of this invention is illustrated in FIG. 1D. An arrow shaft 24 is connected to a bow string 26 by a nock 21 attached to the end of the arrow. The archer draws bow string 26 away from the bow riser 10a. The potential energy stored in bow limbs 11a and 11b is converted to kinetic energy when the archer releases bow string 26. The kinetic energy swiftly accelerates arrow shaft 24 past bow-mounted chronograph 12a along an arrow rest 25. As indicated in FIG. 1A, magnetic sensor 15a is placed juxtapose with traveling arrow shaft 24 through alignment boss 114. The separation distance between magnetic sensor 15a and magnetic triggers 22a and 22b should be greater than 0.075 inches and less than 0.200 inches. This adjustment is made by sliding magnetic sensor cable-connector assembly 43 within adjustment boss 114. The activation side of magnetic sensor assembly 15a is placed towards or facing magnetic triggers 22a and 22b. As I understand it, magnetic flux produced by magnetic triggers 22a and 22b attached to arrow shaft 24 induce a voltage in magnetic sensor 15a. As shown in FIG. 2A, latching magnetic sensor 15a generates square pulse waveform 61 from magnetic flux waveform 60 via Schmitt Trigger. Pulse waveform 61 is a voltage waveform connected to an internal timer circuit in microcontroller 84 via connection 88a. The input to the internal timer circuit is an interrupt. A software program determines microcontroler 84 response to the interrupt. A flowchart detailing program flow is shown in FIG. 4A.

Figure 4B:
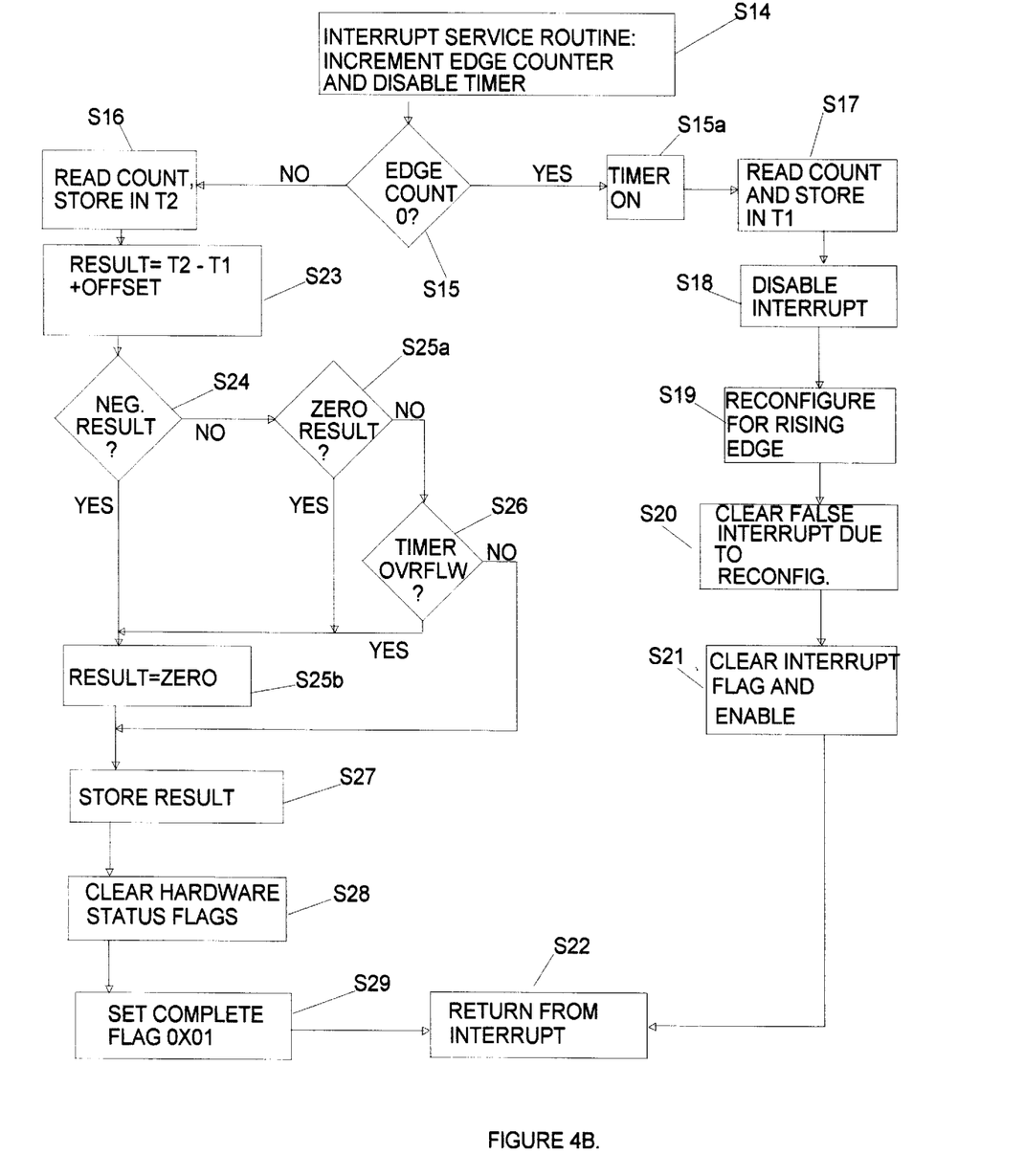
FIG. 4B. A software flowchart for an interrupt service routine for pulse width measurement using an internal timer circuit.

Upon closure of the power switch 34, microcontroller 84 is reset and all program variables and hardware are set to a known condition. During initialization, step S1 and S2 disable the interrupt and configure the interrupt hardware to respond to a falling edge external event. Step S3 through S6 set event counters to predetermined values and enable the interrupt circuitry. The main software program enters a wait loop at step S7 until the external event initiated by passing arrow shaft 24 and trigger mechanism 22a occurs. The transition of pulse waveform 61 from a logic HIGH to a logic LO constitutes a falling edge as illustrated in FIG. 2A. This event forces program execution to proceed to step S14 in FIG. 4B. At step S14, the EDGE COUNTER is incremented from hexadecimal 0xFF to 0x00 and the internal timer is disabled or turned-off. Step S15 is a conditional branch. If the EDGE COUNTER is 0x00 then the external event is known to be a falling edge or the leading edge of the pulse waveform 61. The internal timer is enabled as step S15a. Step S17 reads the counter value from the internal timer and stores the value in memory. Step S18 disables the edge detect interrupt. At step S19, the interrupt hardware is reconfigured to vector on a rising edge or trailing edge of the pulse waveform 61 from the latching magnetic sensor 15a. The internal flag for active interrupts is cleared and reenabled at step S20 and S21 and the interrupt service routine is exited at step S22 with a return to execution at the wait loop in step S7. As arrow shaft 24 proceeds past magnetic sensor 15a, magnetic trigger 22b induces the rising edge of pulse waveform 61 and the interrupt service routine in FIG. 4B is entered a second time.

Step S14 increments the edge counter and turns off the internal timer. The conditional branch at step S15 again determines the nature of the edge of pulse waveform 61. The edge induced by magnetic trigger 22b is the trailing edge of waveform 61, therefore step S16 is executed next. The counter value is read from the internal timer and stored. Next, step S23 subtracts the previous timer value from the value just acquired in step S16. An offset is added to the derived transit time to compensate for timer enable-disable lag. To ease software requirements, the counter word width, such as a 16bit counter, oscillator 82 frequency, and the magnetic trigger separation distance are selected to ensure that the maximum transit time will not induce a counter roll during a valid measurement. If the internal timer is not implemented in such a manner, then microcontroller 84 software must consider internal timer counter overflows. A conditional brand at step S24 checks the underflow status. Steps S25 through S26 provide counter value restoration. Step S27 stores the transit time sequentially in memory. Finally, step S28 clears the hardware and status flags in preparation for the next arrow velocity or arrow position measurement. Step S29 sets the COMPLETE FLAG and step S22 returns program execution to the main program at step S7. The set COMPLETE FLAG passes execution to a conditional branch at step S8. Step S8 determines if tie multiplicative scale factor needs to convert timer data to metric (meters per second) scaling or English (feet per second) scaling.

If metric scaling was chosen by the user, step S10 is executed, else step S9 is executed. Step S11 passes the calculated arrow velocity or arrow position to the display driver routine. Microcontroller 84 transmits the display data to display driver 85 through interface 89. Display Driver 85 contains the required hardware timing and interface requirements to control display 40. The display driver routine is exited and program flow returns to the main program. At step S12, another wait loop is entered until the archer depresses momentary push-button switch 30. The external event detected by step S12 through soffivare input pin polling returns execution to step S13 where the display is cleared and the ARROW COUNTER incremented. Step S1 is reentered and the initial configuration of the internal hardware is set to prepare the bow-mounted chronograph for another arrow velocity or arrow position measurement.

Figure 4C:
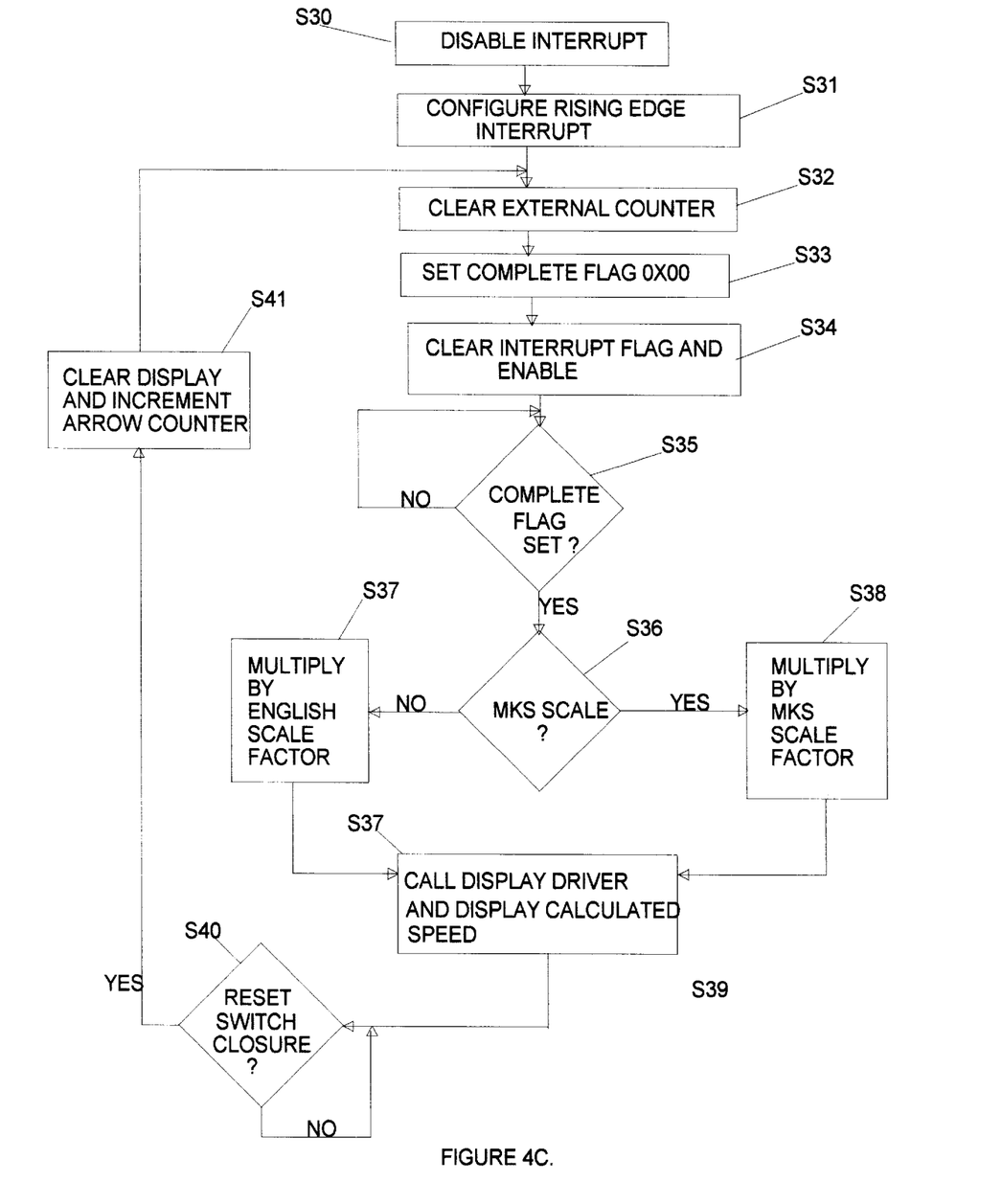
FIG. 4C. A software flowchart for pulse width measurement using an external counter circuit.
Figure 4D:
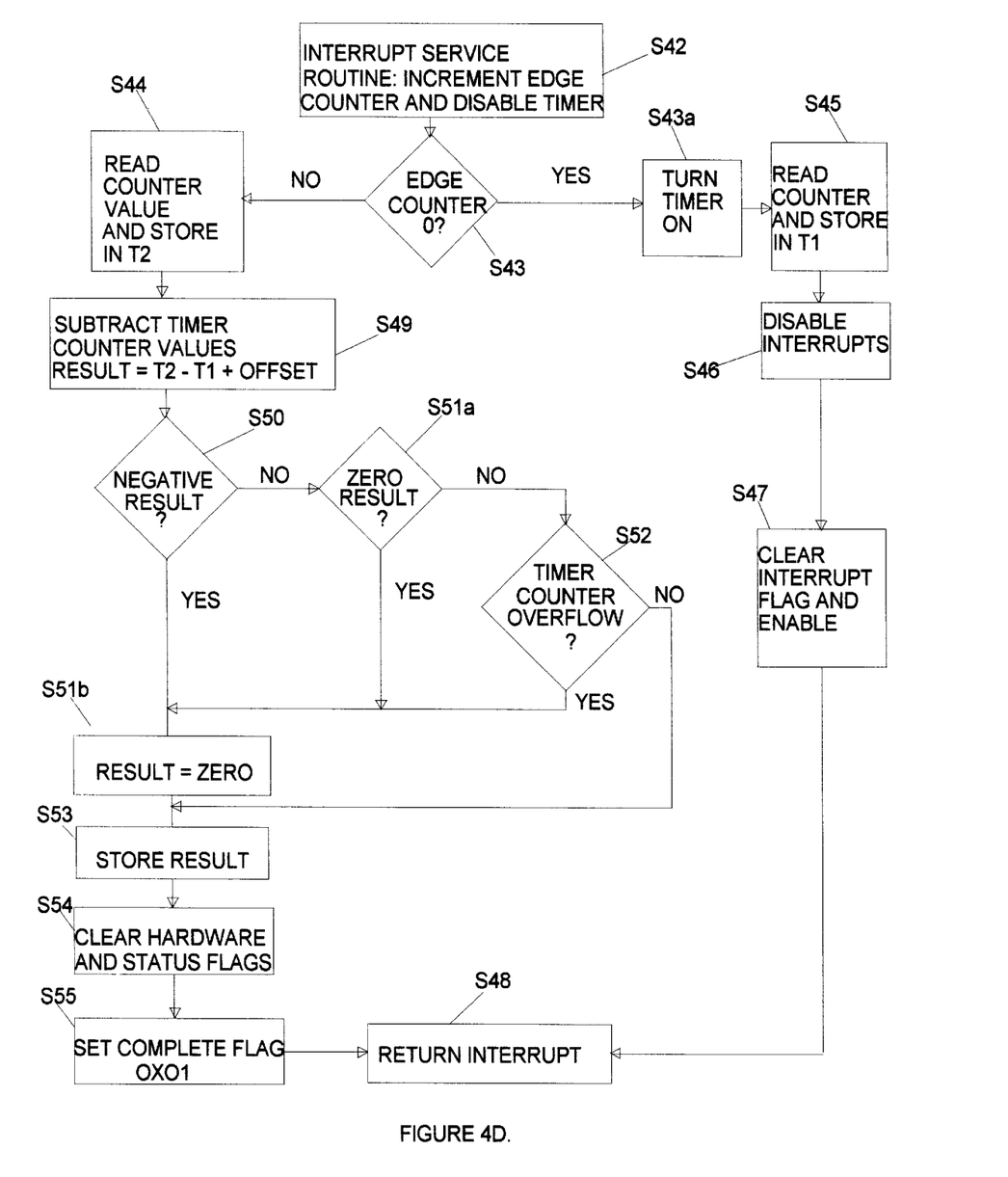
FIG. 4D. A software flowchart for an interrupt service routine for frequency measurement.
Figure 4E:
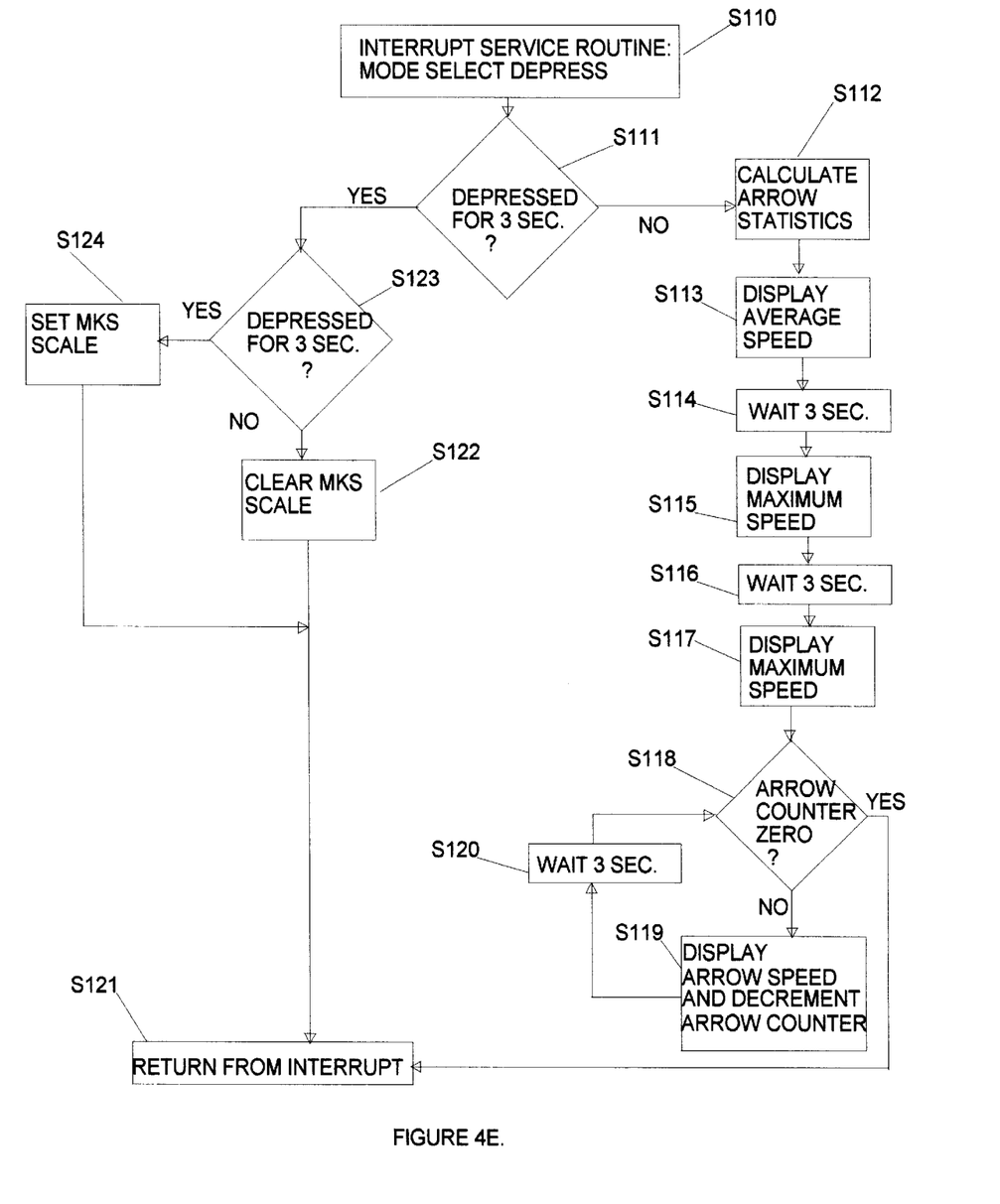
FIG. 4E. A software flowchart for an interrupt service routine for reading a mode-select switch.

For the archer to activate features available through mode-select switch 41, the momentary push-button must be depressed. As the output from switch 41 transitions low an interrupt is triggered through connection 93 to microprocessor 84. FIG. 4E illustrates the interrupt service routine operation after vectoring from the main program. Step S110 is the entry point of the interrupt service routine. A conditional branch at step S111 determines the depression time of mode-select switch 41. If mode-select switch 41 is depressed for less than three seconds, arrow velocity or arrow position statistics are displayed. If mode-select switch 41 is depressed for more than three seconds, the unit scaling branch is executed. To display arrow velocity or arrow position statistics, step S112 retrieves the current consecutive arrow velocity or arrow position measurements from microcontroller 84 memory and calculates the average speed, the maximum speed, and the minimum speed. Next, steps S113 through S117 call the display driver and display the arrow velocity or arrow position statistics with a three second interval between updates. At step S118, a conditional branch determines if tie ARROW COUNTER is zero. For the first iteration of this display loop, the arrow counter is equivalent to the total number of arrows released since the last statistical display. The maximum number of arrow velocity or arrow position recordings is determined by available memory in microcontroller 84 and has been established at twelve for the preferred embodiment. Step S119 calls the display driver and presents consecutive arrow speeds via loop S118–S120. Upon completion of consecutive arrow velocity or arrow position presentation, step S121 is executed and control is returned to the main program. Consequently, if mode-select switch 41 is depressed for at least three seconds, the unit scale branch executes. If mode-select switch 41 is depressed for an additional three seconds, step S123 branches execution to step 124 to set flag MKS SCALE else flag MKS SCALE is cleared in step S122. Again, step S121 is sequentially executed and control is returned to the main program.

DETAILED DESCRIPTION AND OPERATION OF THE ALTERNATE EMBODIMENTS

Figure 1E:
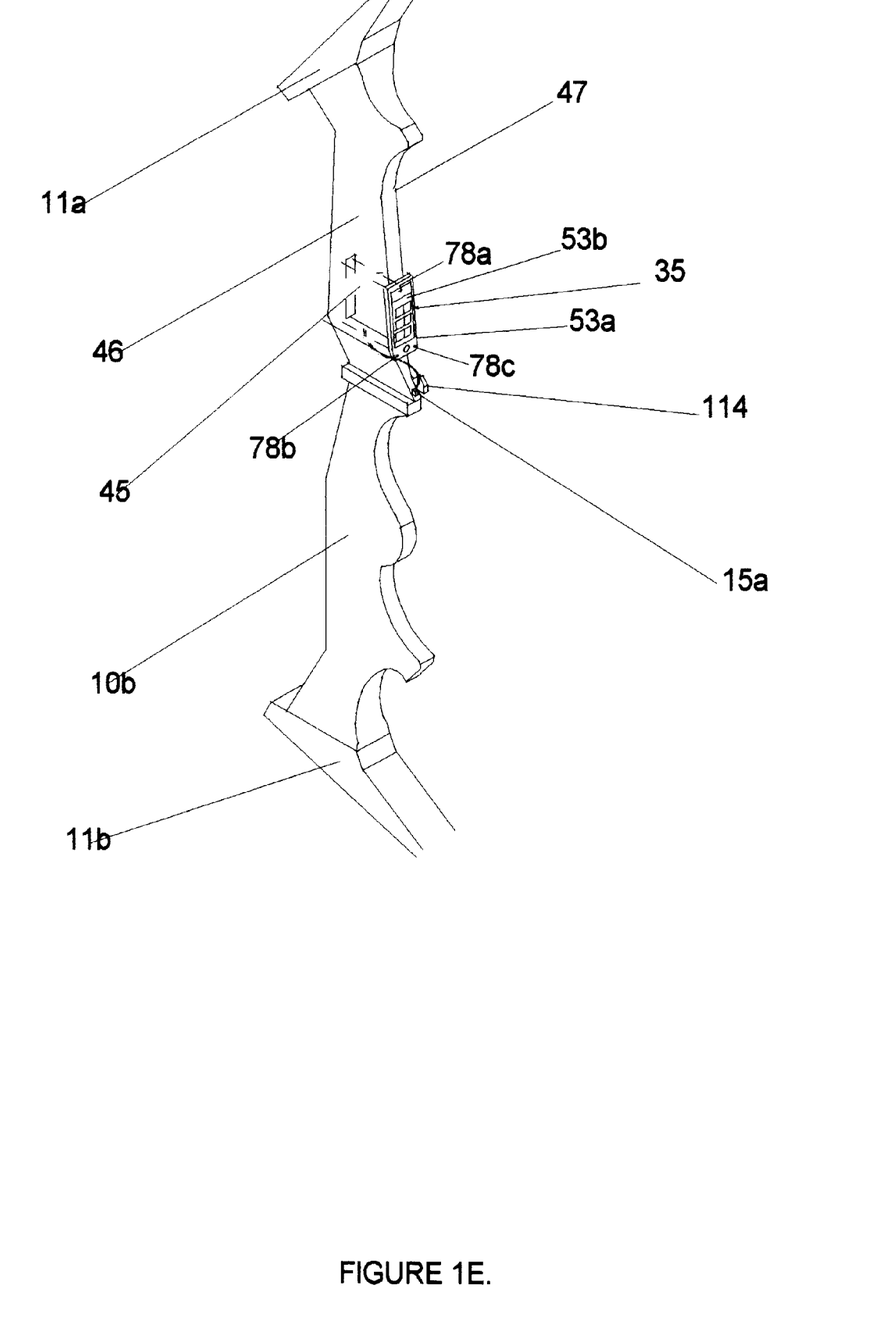
FIG. 1E. Perspective view of an internal bow-mounted chronograph installed on a right-handed bow.

An alternate embodiment relies on the same electronic design described in the preferred embodiment with minor modifications to the structural implementation. During the manufacture of a bow riser 10b a cast or machined cavity 45 with mounting holes is designed to accommodate chronograph electronics assembly 35 as shown in FIG. 1E. Reference numerals 46 and 47 identify the inboard and outboard side of right-handed bow riser 10b, respectively. Chronograph electronics assembly 35 is attached to bow riser 10b by using bezel 53a, lens 53b, and attachment screws 78a, 78b, and 78c.

Figure 2B:
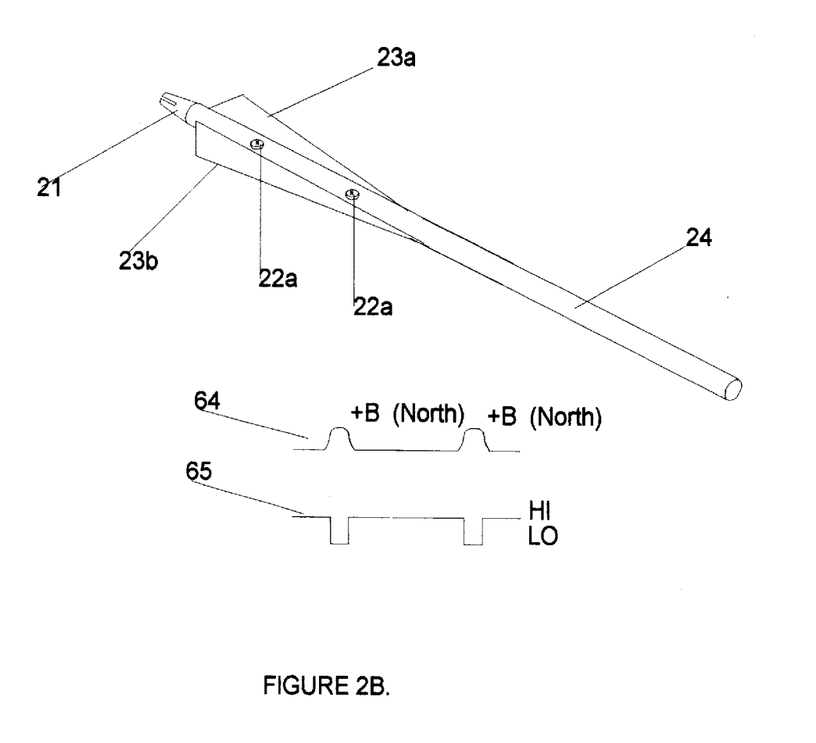
FIG. 2B. A perspective view of an arrow shaft with a dual, like-pole disk magnetic trigger installed and its associated magnetic flux and magnetic sensor electrical characteristics.

Another alternate embodiment relies on tie same structural design described in the preferred embodiment with minor modifications to the electronic hardware and software. Magnetic sensor 15b is substituted for magnetic sensor 15a. The magnetic trigger implemented is a dual, like-pole magnetic trigger using two north pole oriented permanent magnets as illustrated in FIG. 2B. As I understand it, Pulse waveform 65 from a nonlatching magnetic sensor 15b is generated from a magnetic field 64. The computation and display hardware functions are identical to the preferred embodiment without the requirement of reconfiguring the interrupt hardware to detect both rising and falling edges of a waveform. FIG. 4D shows the flow chart for an interrupt service routine to determine the frequency of pulse waveform 65 using the software program in FIG. 4A. This alternate embodiment determines pulse waveform 65 frequency, thus only waveform leading edges produce an interrupt vector event. Therefore, steps S42 through S55 are functionally similar to the steps in FIG. 4B flowchart with the exception of interrupt edge reconfiguration.

Figure 4F:
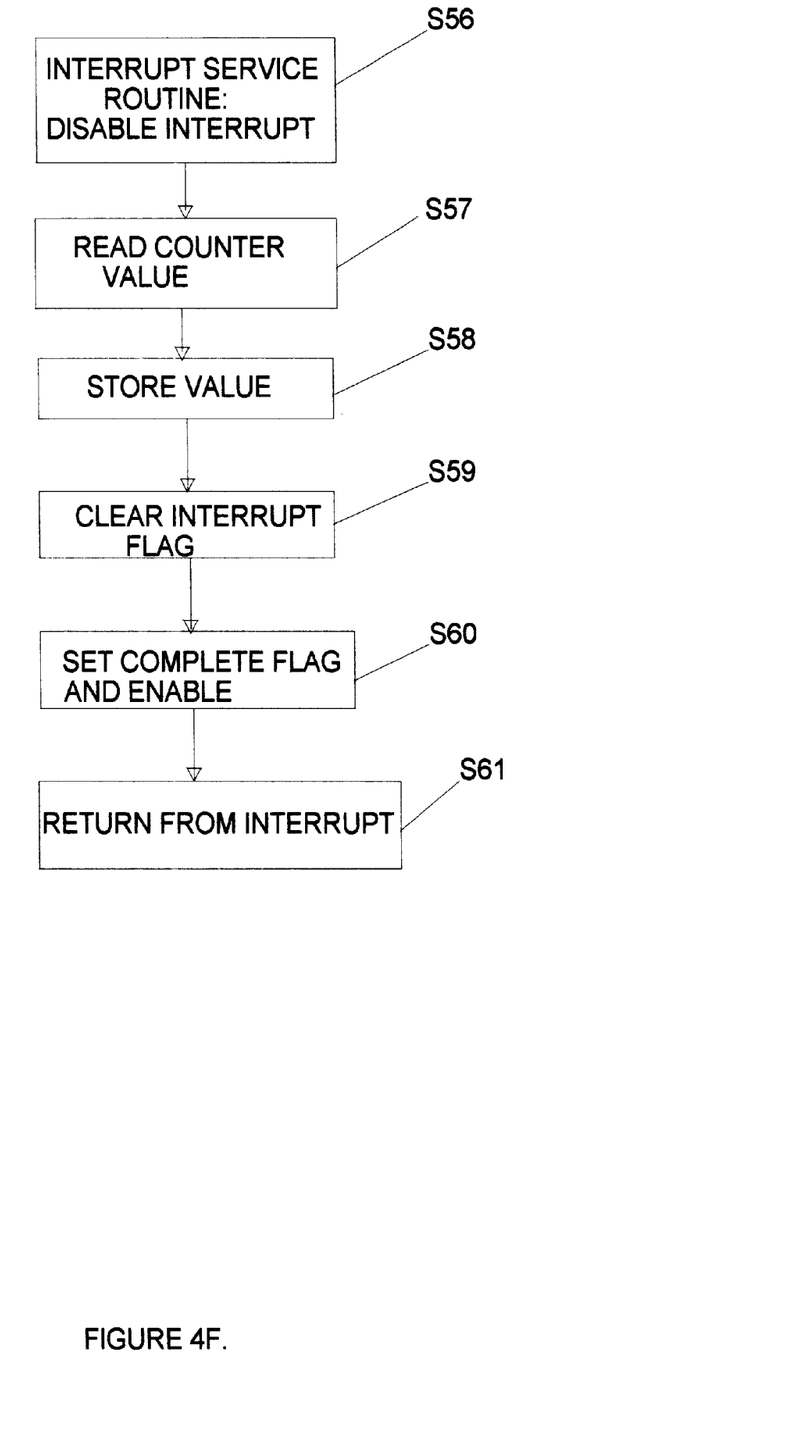
FIG. 4F. A software flowchart for an interrupt service routine for pulse width measurement using an external timer circuit.
Figure 4G:
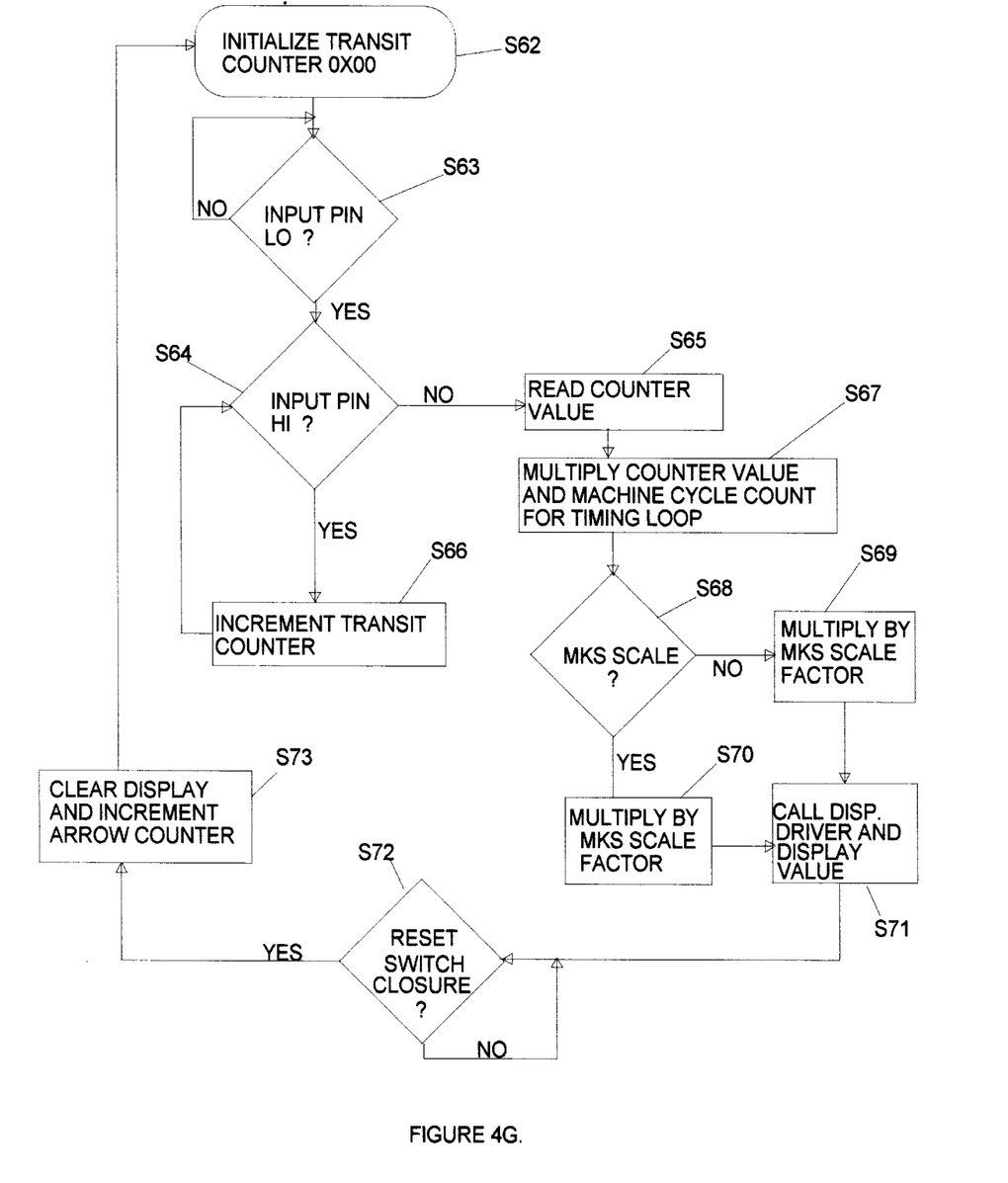
FIG. 4G. A software flowchart for pulse width measurement using a software timing loop.

Another alternate embodiment relies on tde same structural and electronic design described in the preferred embodiment with minor modifications to tie software as shown in FIG. 4G. Pulse waveform 61 is generated as described in the preferred embodiment. In this alternate embodiment, microcontroller 84 polls magnetic sensor 15a input through interface line 88a. Step S62 initializes the TRANSIT COUNTER to 0×00. A wait loop at step S63 determines if magnetic trigger 22a has passed by magnetic sensor 15a. If this leading edge event has occurred, step S64 determines the minimum width by a conditional branch. If the input pin is no longer a logic LOW, the arrow velocity or arrow position either exceeded the resolution of this embodiment or a glitch occurred. A reading of zero arrow velocity or arrow position will result. If the input is maintained at a logic LOW, the timing loop continues to count the event at step S66. The passing of magnetic trigger 22b forces software execution to step S65 where the TRANSIT COUNTER is read. To determine the transit time, the TRANSIT COUNTER is multiplied by the machine cycle count for timing loop S64 and S66 in step S67. Next, conditional branch S68 determines the unit scale factor to use and advances through either step S69 or step S70. Step S71 displays the derived value and a reset wait loop is entered at step S72. A closure of push-button switch 30 advances program execution to step S73 where the display is deared and the ARROW COUNTER is incremented. Finally, step S62 is reentered for another measurement sequence.

Figure 5B:
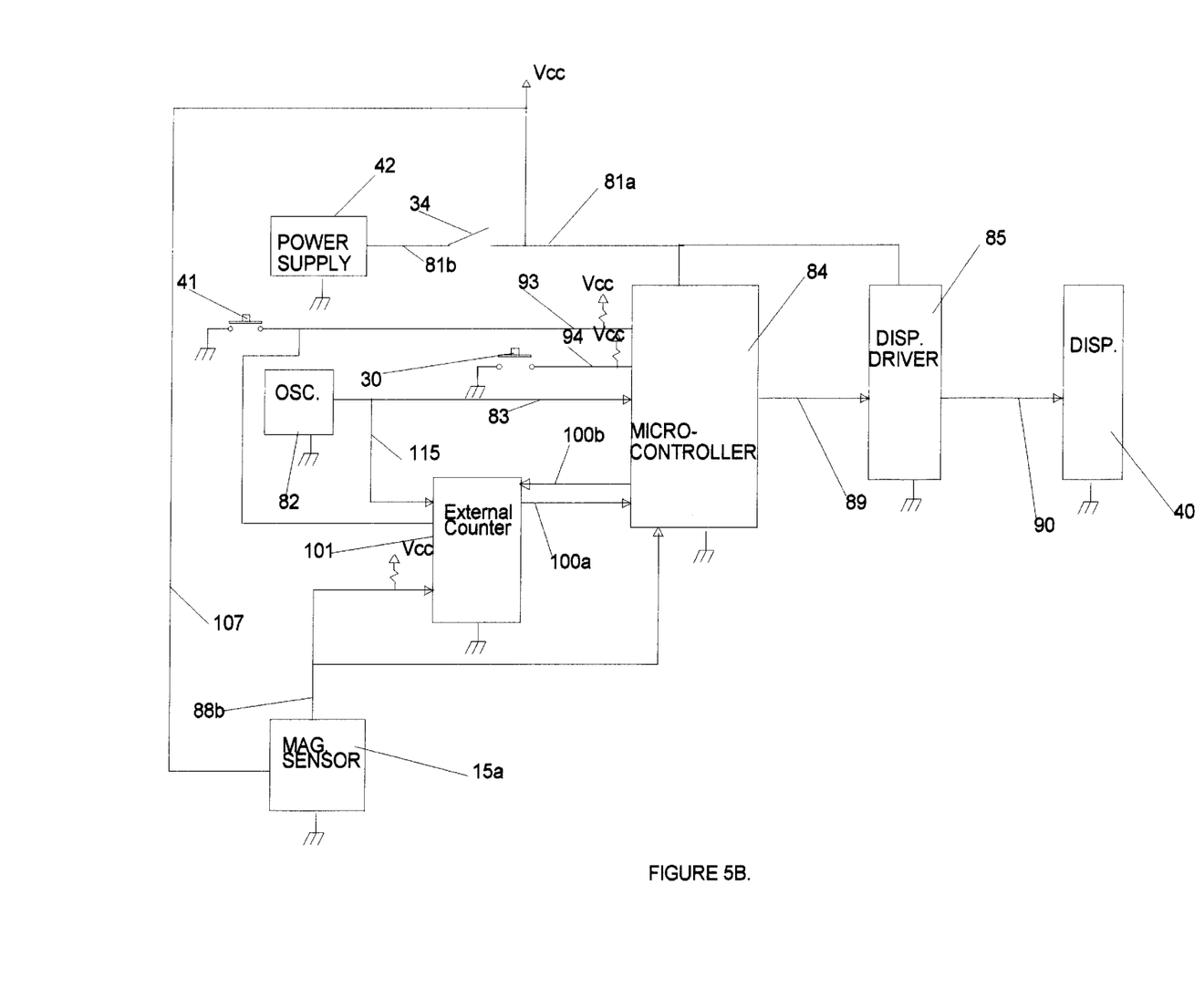
FIG. 5B. A schematic of an electronic circuit to measure pulse width using an external circuit.

Yet another alternate embodiment relies on the same structural design described in the preferred embodiment with modifications to the hardware as shown in FIG. 5B. This alternate embodiment also requires modifications to chronograph software as illustrated in FIG. 4C. The output of magnetic sensor 15a is connected through line 88b to the enable or inhibit count pin of an external counter circuit 101. External counter circuit 101 is connected to microcontroller 84 through interface 100a and 100b and is also connected to oscillator 82 by line 115. The magnetic trigger used to measure transit time is implemented with permanent magnets 22a and 22b. As previously described in the preferred embodiment, magnetic trigger 22a and 22b pass magnetic sensor 15a and generate pulse waveform 61. In this embodiment, pulse waveform 61 enables external counter 101. External counter 101 receives its time base from free-running oscillator 82. Pulse waveform 61 enables or permits external counter 101 to increment its count from its reset value to a new value, proportional in time, to the pulse width generated by magnetic trigger 22a and 22b which is directly proportional to the speed of arrow shaft 24. Magnetic sensor 15a creates an interrupt signal to alert microcontroller 84 that a measurement cycle is complete. FIG. 4C and FIG. 4F illustrates microcontroller 84 response to these external events.

Step S30 and S31 disable the interrupt and set microcontroller 84 interrupt activation to the trailing edge of pulse waveform 61. Step S32 resets external counter to a known state through interface 100b. Steps S33 and S34 clear the execution flags and enable the interrupt circuitry for an external event. A wait loop is entered in step S35 until magnetic trigger 22a and 22b create the external timing event. Upon detection of the interrupt, microcontroller 84 enters an interrupt service illustrated in FIG. 4F. Step S56 disables the interrupt circuitry and external counter 101 output value is read from interface 100a in step S57. The counter value is stored sequentially into memory in step S58. The interrupt service routine clears the interrupt flag at step S59, sets the COMPLETE FLAG and enables the interrupts at step S60 and returns program execution in step S61. A conditional branch at step S35 passes program execution to S36 once the COMPLETE FLAG is set. The conditional branch at step S36 determines whether to apply metric scaling in step S38 or English scaling in step S37. Following the multiplicative scale factor application, step S39 executes a call to the display driver routine to convert the scaled number to a display value and writes to display 40 as explained in the preferred embodiment. Sequentially, step S40 monitors momentary push-button switch 30 to reset or clear display 40. Upon closure of switch 30, program execution proceeds to step S41 to clear display 40, increment ARROW COUNTER, and resume execution at step S32 to prepare for another external event.

Numerous configurations have been demonstrated in the previous paragraphs. As apparent to those skilled in the art, various modifications and substitutions may be made to the techniques and structures disclosed herein without departing from the spirit and scope of the following claims. Consequently, it should be understood that the device and methods described herein are illustrative only and are not limiting upon the scope of the present invention.

What is claimed is:

1. A instrument for measuring arrow velocity and arrow position, said instrument comprising:
    a) a magnetic sensor for detecting and communicating data pertaining to arrow velocity and arrow position, and
    b) a inexpensive magnetic trigger mechanism attached directly to a arrow shaft, and
    c) a electronics assembly for receiving, processing, and displaying said data, and
    d) a interconnect to place said sensor in comniunication with said electronics assembly, and
    e) a mounting bracket for holding said sensor to a bow, and
    f) a housing for holding said electronics assembly to said bow,
whereby an archer can use said instrument to determine arrow velocity or data indicative of arrow position at either a stationary or moving target, and whereby said data can be used to detect or improve archery tackle performance.

2. The instrument of claim 1 wherein said instrument is attached externally to said bow.

3. The instrument of claim 1 wherein said instrument is attached to an internal cavity in said bow.

4. The instrument of claim 1 wherein said electronics assembly uses an internal counter to determine said data.

5. The instrument of claim 1 wherein said electronics assembly uses an external counter circuit to determine said data.

6. The instrument of claim 1 wherein said instrument utilizes a single sensor to detect arrow velocity or data indicative of arrow position.

7. The sensor of claim 6 wherein said sensor is a latching sensor.

8. The sensor of claim 6 wherein said sensor is a non-latching sensor.

9. The instrument of claim 1 wherein said instrument can be mounted on a right-handed or left handed bow.

10. A instrument for measuring arrow velocity and arrow position, said instrument comprising:
    a) means for sensing and communicating data pertaining to arrow velocity and arrow position, and
    b) means for receiving, processing, and displaying said data, and
    c) means to place said sensing means in communication with said receiving means, and
    d) means for holding said sensing means to a bow, and
    e) means for holding said receiving, processing, and display means to said bow,
whereby an archer can use said instrument to determine arrow velocity or data indicative of arrow position at either a stationary or moving target, and whereby said data can be used to detect or improve archery tackle performance.

11. The instrument of claim 10 wherein said instrument is attached externally to said bow.

12. The instrument of claim 10 wherein said instrument is attached to an internal cavity in said bow.

13. The instrument of claim 10 wherein said instrument utilizes a single sensing means is to detect arrow velocity or data indicative of arrow position.

14. The instrument of claim 10 wherein said instrument can be mounted on a right-handed or left handed bow.

15. A method for measuring archery tackle performance comprising the steps of:
    a) exposing a single sensing means to a moving arrow, said sensing means communicating data pertaining to arrow velocity or position, and
    b) processing statistical parameters of said data, and
    c) displaying said data.

* * * * *